(12) United States Patent
Sasaki

(10) Patent No.: US 7,936,400 B2
(45) Date of Patent: May 3, 2011

(54) SIGNAL PROCESSING APPARATUS AND METHOD

(75) Inventor: Yutaka Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1296 days.

(21) Appl. No.: 11/504,281

(22) Filed: Aug. 15, 2006

(65) Prior Publication Data
US 2007/0085932 A1    Apr. 19, 2007

(30) Foreign Application Priority Data

Aug. 17, 2005  (JP) ................................ 2005-236730

(51) Int. Cl.
*H04N 5/268* (2006.01)
*H04N 9/74* (2006.01)
(52) U.S. Cl. ................ 348/705; 348/584; 348/595
(58) Field of Classification Search .............. 348/705, 348/706, 578, 584, 585, 591, 593, 595, 588; 386/52, 53; *H04N 9/74, 5/268*
See application file for complete search history.

(56) References Cited

U.S. PATENT DOCUMENTS
4,837,627 A * 6/1989 Mengel .................. 348/706

FOREIGN PATENT DOCUMENTS
| JP | 7 99606 | 4/1995 |
| JP | 2004 173074 | 6/2004 |
| JP | 2004 287342 | 10/2004 |
| JP | 2004 341886 | 12/2004 |
| JP | 2005 136653 | 5/2005 |
| WO | WO 2005 074255 | 8/2005 |

* cited by examiner

*Primary Examiner* — Sherrie Hsia
(74) *Attorney, Agent, or Firm* — Frommer Lawrence & Haug LLP; William S. Frommer

(57) ABSTRACT

A signal processing apparatus includes a signal processing unit for applying predetermined processing to a signal to be supplied. A parameter adjusting unit manually and continuously changes a parameter in processing the signals using the signal processing unit. At least one operating unit has a function different from a function of the parameter adjusting unit; and a value of the parameter and any one of the operating units are made to correspond to each other. A detection unit detects that a current parameter value attributed to the operation of the parameter adjusting unit agrees with a value of a parameter within the data, and a function of the operating unit is executed in response to the value of the parameter within the data based on a detection result of the detection unit.

13 Claims, 12 Drawing Sheets

WHOLE CONSTITUTION OF SWITCHER

CONSTITUTION OF CONTROL PANEL 1

POSITION OF FADER LEVER AND OUTPUT RATE

FIG. 6

EVENT DATA

| SYMBOL | { MEXpt | | |
|---|---|---|---|
| GROUP OF PARAMETERS | PARAMETER NAME | , SET VALUE | |
| | { ME, | , ME1 | }, |
| | { MEBus | , A | }, |
| | { Xpt | , 1 | }, |
| | { Videokey | , Video | } } |

FIG. 7

PARAMETER IN MACRO ATTACHMENT DATA

| GROUP OF PARAMETER | PARAMETER NAME | , SET VALUE | |
|---|---|---|---|
| | { Module | , ME1Xpt | }, |
| | { Button | , ABus1 | }, |
| | { MacroReg | , 1 | }, |
| | { MacroMode | , Pre | },} |

FIG. 9

MACRO ATTACHMENT DATA ON FADER

| GROUP OF PARAMETER | PARAMETER NAME , SET VALUE | |
|---|---|---|
| | { { Module , PPStandardTransition | }, |
| | { Button , MainFader | }, |
| | { MacroReg , 1 | }, |
| | { MacroMode , NoAssign | }}, |
| EVENT DATA | | |
| SYMBOL | { { METransitionFader , | |
| GROUP OF PARAMETER | PARAMETER NAME , SET VALUE | |
| | { ME , PP | }, |
| | { FaderValue , 50 | } } } |

FADER LEVER AT CENTER POSITION

EXAMPLE IN WHICH CONTROL OF VTR IS INTERLOCKED

EXAMPLE IN WHICH CONTROL OF CHARACTERS IS INTERLOCKED

SIGNAL PROCESSING APPARATUS AND METHOD

CROSS REFERENCES TO RELATED APPLICATIONS

The present invention contains subject matter related to Japanese Patent Application JP 2005-236730 filed in the Japanese Patent Office on Aug. 17, 2005, the entire contents of which being incorporated herein by reference.

BACKGROUND OF THE INVENTION

1. Field of the Invention

The present invention relates to a signal processing apparatus which includes operating means for manually continuously changing parameters in processing signals and operating means which has another function, and more particularly to a signal processing apparatus which can enhance operability and reduce operation errors.

2. Description of Related Art

As one of business-use apparatuses which are used for editing images in television broadcasting or the like, there has been known an image signal processing apparatus which is referred to as a switcher. The switcher is an apparatus which selects and outputs video signals from inputted video signals (video signals from a video camera, a VTR or the like) of a plurality of channels or applies an effect to transit outputted video signals from one video signals to another video signals (a transition effect).

The switcher is, in general, constituted of a switcher body and a control panel. On the control panel, as operating means, a plurality of push buttons is mounted together with a fader.

The fader is operating means for manually and continuously (sequentially) changing a parameter indicative of an output rate of two video signals by moving a slide-type lever from one end portion to another end portion in applying the above-mentioned transition effect.

To the push buttons, a function of controlling a switcher body (selection of an input signal, display of characters or the like), a function of controlling an external equipment (VTR or the like) or the like are allocated.

In editing the images using the switcher, in an interlocking manner with the operation of the fader, at timing that two video signals assume a specific output rate, in many cases, it is necessary to execute another function. For example, a case in which a VTR is controlled at timing that two video signals assume a specific output rate, and another video signal which is displayed while being sandwiched between two video signals is reproduced by the VTR may correspond to such a case. Further, a case in which characters are displayed in response to one of two video signals at timing that two video signals assume a specific output rate also corresponds to such a case.

Conventionally, to execute another function in an interlocking manner with the operation of the fader in this manner, an operator operates a push button with one hand at a suitable timing while operating the fader with the other hand or another operator takes charge of operating the push button and two operators perform the operation at proper timing in a cooperating manner.

Here, as the image signal processing apparatus having the fader, there has been also proposed an image signal processing apparatus even when a lever of a fader is moved to an end portion, the transition to a video signal after switching is not completed and such movement provides a halfway state (see JA-A-2004-173074 (paragraphs 0054 to 0058, FIG. 5), for example). However, such an image signal processing apparatus also has a drawback that it is necessary to operate both of the fader and the push button to execute another function in an interlocking manner with the operation of the fader.

SUMMARY OF THE INVENTION

However, to operate the fader and the push button at a proper timing is an operation which requires the concentration and hence, a large burden is imposed on an operator. Further, timing for operating the fader and the timing for operating the push button are displaced from each other or an operator forgets to operate the push button, an edition error may take place.

Particularly, when a series of functions are executed with complicated procedure or it is necessary to perform a large number of other functions at a time in an interlocking manner with the operation of the fader, it is necessary to operate the push button with complicated procedure or it is necessary to operate a large number of push buttons at a time and hence, the possibility that the edition error takes place is increased.

The invention has been made in view of the above-mentioned drawbacks and addresses to provide a signal processing apparatus such as the above-mentioned switcher which includes parameter adjusting means for manually continuously changing a parameter in processing signals and operating means having other function, wherein other function is executed easily and accurately in an interlocking manner with the operation of the parameter adjusting means.

To overcome the above-mentioned drawbacks, according to one embodiment of the invention, there is provided a signal processing apparatus which includes signal processing means for applying predetermined processing to a signal to be supplied, parameter adjusting means for manually and continuously changing a parameter in processing the signals using the signal processing means, at least one operating means which has a function different from a function of the parameter adjusting means, forming means for forming data which makes a value of the parameter and any one of the operating means correspond to each other, detection means for detecting that a current parameter value attributed to the operation of the parameter adjusting means agrees with a value of a parameter within the data, and function executing means for executing a function of the operating means in response to the value of the parameter within the data based on a detection result of the detection means.

According to another embodiment of the invention, there is provided a method for executing a function of operating means in a signal processing apparatus which includes signal processing means for applying predetermined processing to a signal to be supplied, parameter adjusting means for manually and continuously changing a parameter in processing the signals using the signal processing means, at least one operating means which has a function different from a function of the parameter adjusting means, and control means for executing functions of the parameter adjusting means and the operating means, the method includes the steps of forming by the control means data which makes a value of the parameter and any one of operating means correspond to each other, detecting by the control means that a current value of the parameter attributed to the operation of the parameter adjusting means and the value of the parameter within the data agrees with each other, and executing by the control means a function of the operating means corresponding to the value of the parameter within the data based on a result of the detection.

According to another embodiment of the invention, data which makes the parameter value in processing the signal using the signal processing means and the operating means having a function different from a function of the parameter adjusting means correspond to each other is formed.

Then, when the parameter is continuously changed by operating the parameter adjusting means and a state in which the current value of the parameter agrees with the value of the parameter in the inside of the data is acquired, the acquisition of the state is detected, and a function of the operating means which corresponds to the value of the parameter in the inside of the data is automatically executed.

In this manner, by merely operating the parameter adjusting means, at timing that the parameter assumes the specified value, the function of another operating means is automatically executed. Accordingly, it is possible to easily and accurately execute another function in an interlocking manner with the manipulation of the parameter adjusting means.

Further, by arbitrary setting the parameter value in the inside of the data, it is possible to execute another function at an arbitrarily timing.

According to another embodiment of the invention, in a signal processing apparatus which includes parameter adjusting means for manually continuously changing parameters in processing signals and operating means which has another function, it is possible to have an advantageous effect that another function can be executed easily and accurately at arbitrary timing in an interlocking manner with the operation of the parameter adjusting means.

BRIEF DESCRIPTION OF THE DRAWINGS

FIG. 6 is a view which illustrates event data.

FIG. 7 is a view which illustrates a parameter in macro attachment data.

FIG. 9 is a view which illustrates the macro attachment data with respect to the fader.

DESCRIPTION OF PREFERRED EMBODIMENTS

Figure 1:
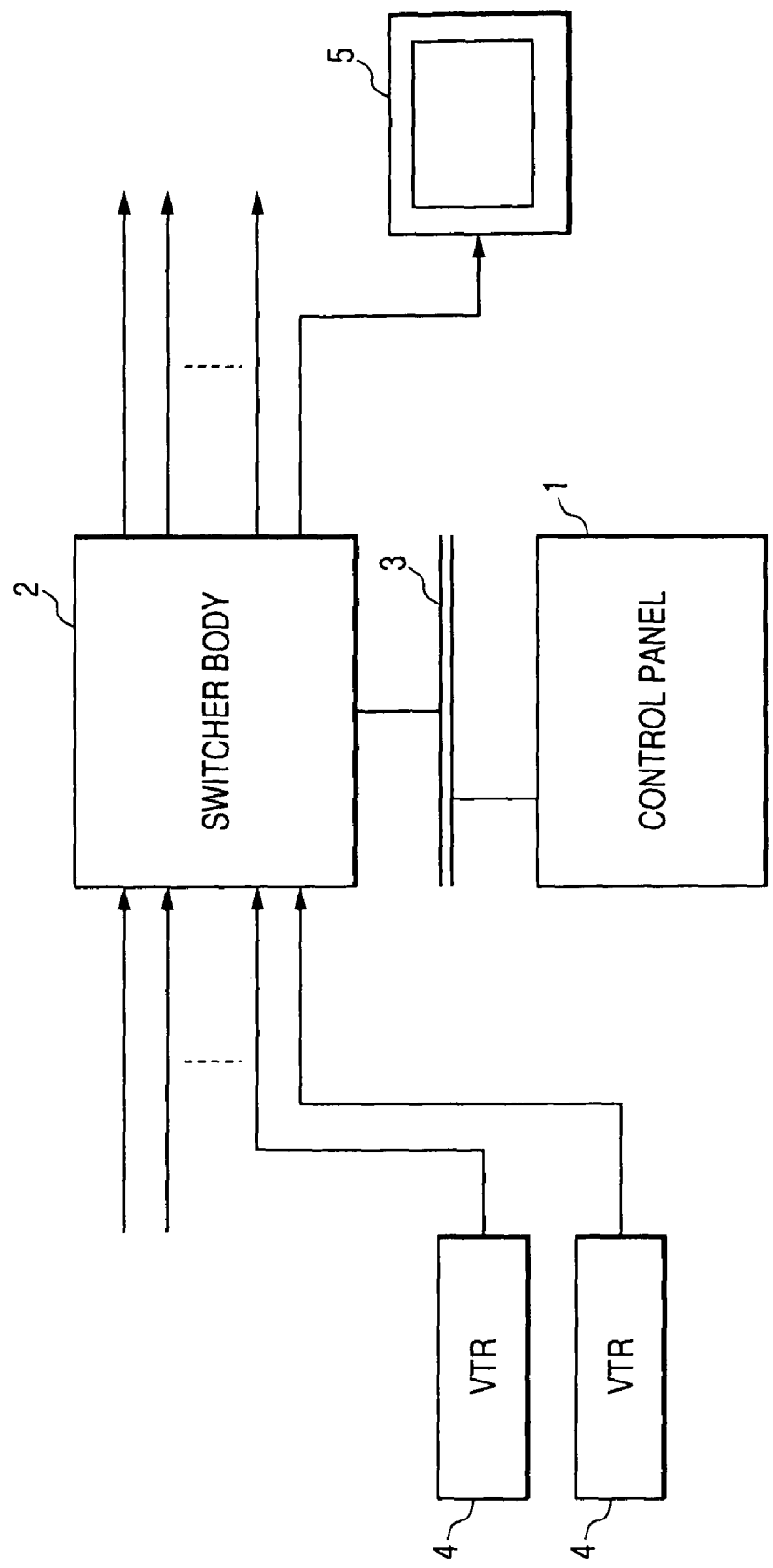
FIG. 1 is a view showing the whole constitution of a switcher to which the invention is applied.

Hereinafter, an example to which the invention is applied to a switcher is explained specifically in conjunction with drawings. FIG. 1 is a view showing the whole constitution of the switcher to which the invention is applied. The switcher is constituted of a control panel 1 and a switcher body 2. The control panel 1 and the switcher body 2 are connected with each other via a network (LAN) 3.

To the switcher body 2, video signals are inputted from a plurality of VTRs 4 and a video camera not shown in the drawing. An output video signal of the switcher body 2 is transmitted to a monitor 5, program transmitting equipment, a video recording apparatus and the like not shown in the drawing.

Figure 2:
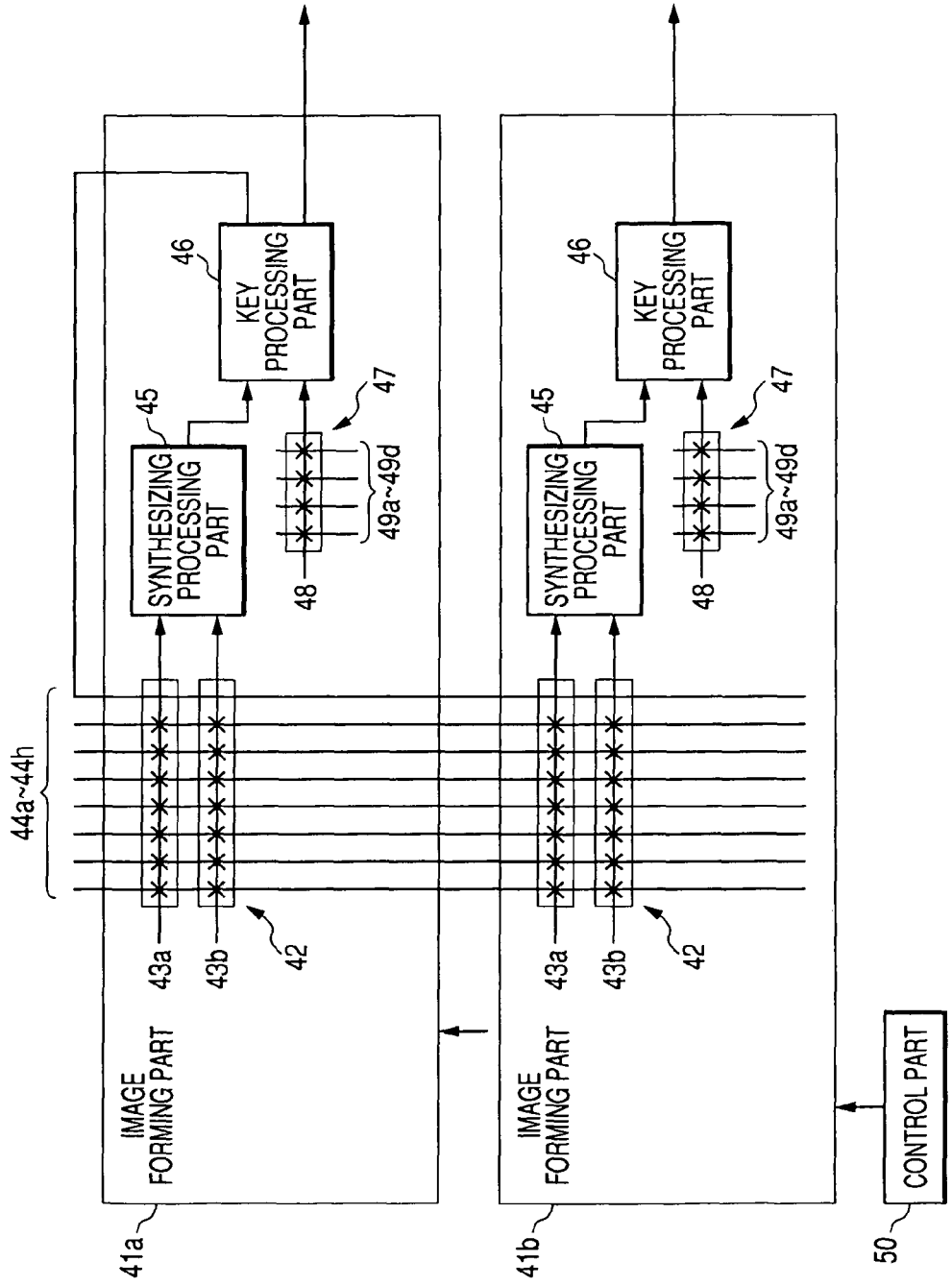
FIG. 2 is a view showing a constitutional example of a switcher body.

FIG. 2 is a view showing a constitutional example of the switcher body 2. The switcher body 2 includes a plurality of image processing part 41 (two image processing parts 41a, 41b out of the plurality of image processing parts 41 being shown in the drawing) and a control part 50. Each image processing part 41 includes an input selecting part 42, a synthesizing processing part 45, a key processing 46, and a key signal selecting part 47.

The input selecting part 42 includes a group of switches in a matrix array which connect input buses 43a, 43b to some of respective input lines 44a to 44h (lines through which video signals from the VTR 4 and the video camera shown in FIG. 1 and signals which are generated in the inside of the switcher are inputted), wherein in the input buses 43a, 43b, an input signal from any one of input lines can be selected. The signal which is selected by the input selecting part 42 is supplied to the synthesizing processing part 45.

The synthesizing processing part 45 is a circuit which applies an effect to transit an outputting video signal from a certain video signal to another video signal (a transition effect). As kinds of the transition effect, a wipe in which a certain video signal is gradually changed over to another video signal, a DME wipe, the keying synthesis which synthesizes another video signal to a portion of a display region of a certain video signal, an NAM and the like can be named. An output signal of the synthesizing processing part 45 is supplied to the key processing part 46.

The key signal selecting part 47 includes a group of switches which connects an input bus 48 to any one of input lines 49a to 49d (lines to which key signals indicative of rows of letters such as characters) and can select an input signal from any one of input lines. A key signal which is selected by the key signal selecting part 47 is supplied to the key processing part 46.

The key processing part 46 is a circuit which synthesizes the key signal selected by the key signal selecting part 47 to an output signal of the synthesizing processing part 45. An output signal of the key processing part 46 is outputted to the outside of the switcher body 2 and is transmitted to a monitor 6 or the like as shown in FIG. 1.

Further, the output signal of the key processing part 46 in the image processing part 41a is inputted again to the input selecting part 42 of the image processing part 41b through the input line 44h. Accordingly, by using the switcher in a state that the image processing part 41a and the image processing part 41b are connected in series, to the video signal to which the transition effect and the key processing are applied in the image processing part 41a, the transition effect and the key processing may be further applied in the image processing part 41b.

The control part 50 is constituted of a micro computer and a communication interface for network, and controls the respective image processing parts 41 in response to commands transmitted thereto from the control panel 1 shown in FIG. 1 via the LAN 3.

Figure 3:
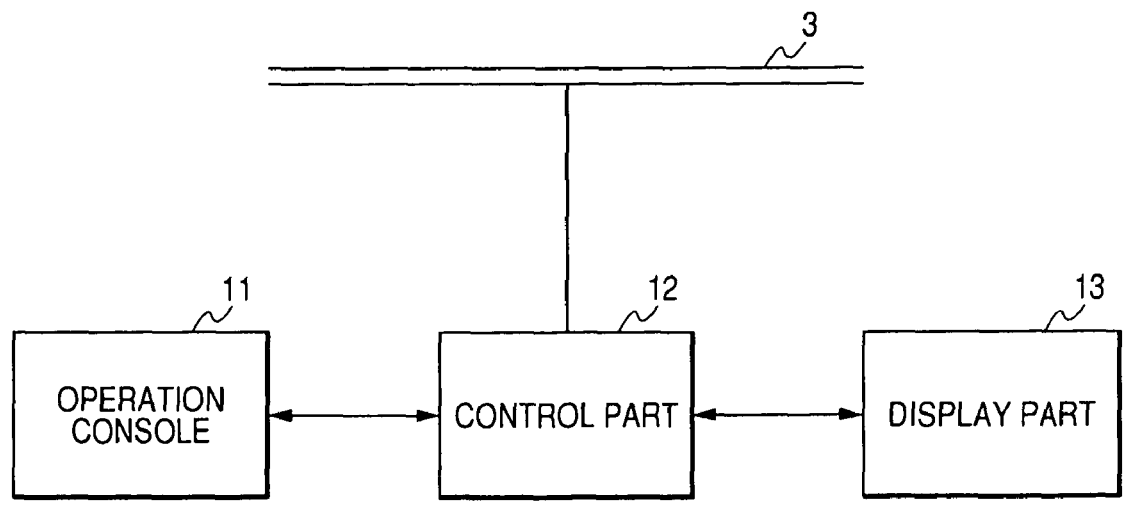
FIG. 3 is a view showing the constitution of a control panel.

The control panel 1 is a panel which performs a control of the switcher body 2 and a control of the VTR 4. FIG. 3 is a view showing the constitution of a control panel 1. The control panel 1 is constituted of an operation console 11, a control part 12 and a display part 13 (for example, a liquid crystal display).

The control part 12 is constituted of a microcomputer, a communication interface for network, and a communication interface for serial communication, wherein the control part transmits commands corresponding to contents of operations of the operation console 11 to the control part 50 in the inside of the switcher body 2 via the LAN 3 (FIG. 2) or transmits the commands to the VTR 4 (FIG. 1) by serial communication.

Further, the control part 12 controls a display content of the display part 13 in response to an operation content of the operation console 11, information which is received from the control part 50 in the inside of the switcher body 2 and the like. Further, the control part 12 performs the processing peculiar to the invention which is explained later in conjunction with FIG. 8 and FIG. 10.

Figure 4:
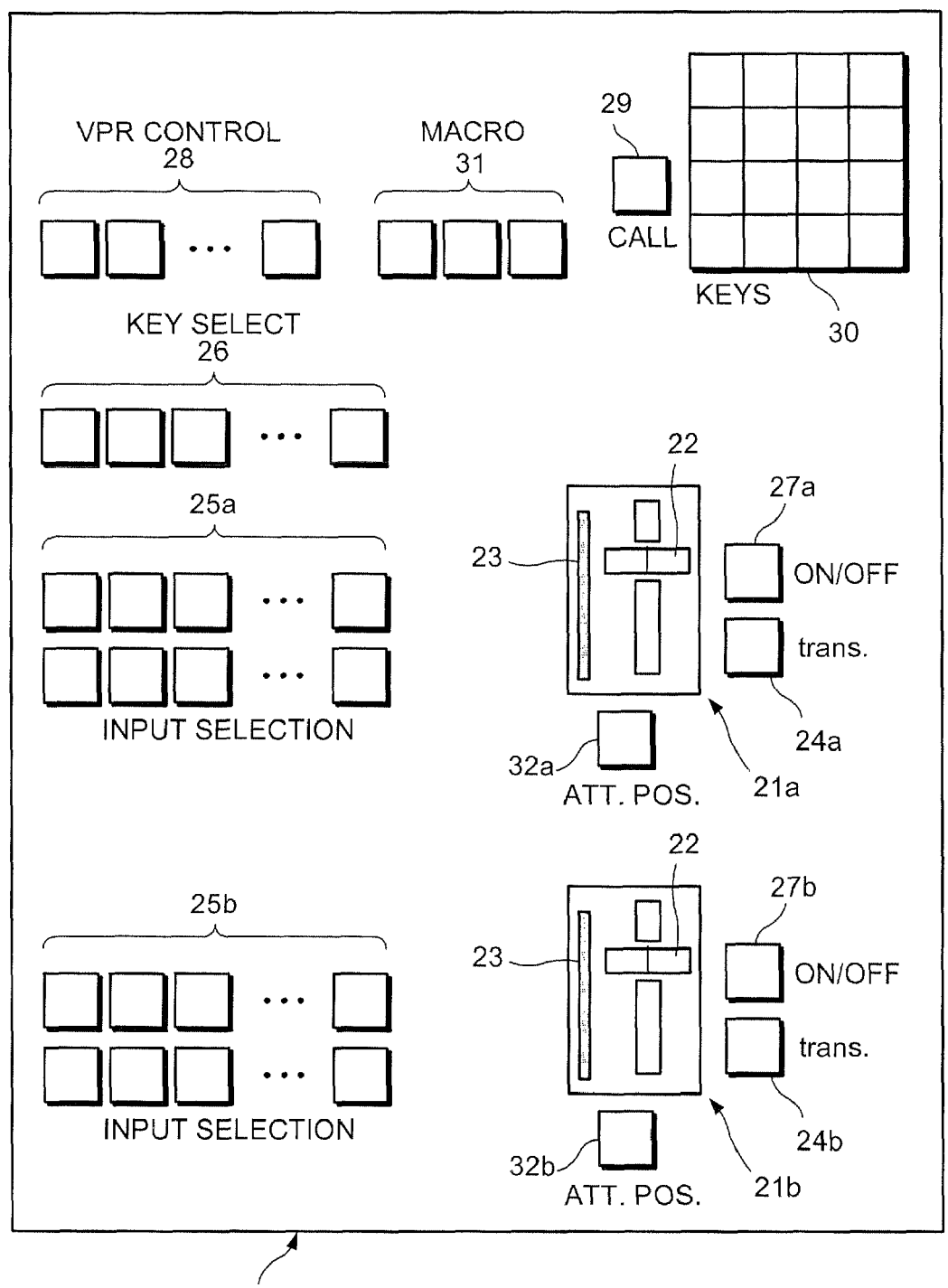
FIG. 4 is a view showing operating means on an operation console of the control panel.

On the operation console 11, various kinds of operating means which are provided for performing an operation of the switcher body 2, an operation of the VTR 4, a setup of the switcher and the like are arranged. FIG. 4 is a view showing parts relevant to the invention out of these operating means. On the operation console 11, following operating means are arranged.

(1) two sets of faders 21 (21a, 21b)
(2) two sets of automatic transition buttons 24 (24a, 24b)
(3) two sets of groups of push buttons 25 for input selection (25a, 25b)
(4) a group of push buttons 26 for selecting key signals
(5) two sets of key-ON/OFF changeover buttons 27 (27a, 27b)
(6) group of push buttons 28 for controlling VTR
(7) call buttons 29 of macro register
(8) ten key 30
(9) a group of push buttons 31 for macro setting and execution
(10) two sets of attachment position setting buttons 32 (32a, 32b)

Out of two sets of faders 21, the fader 21a is provided for operating the synthesizing processing part 45 of the image processing part 41a (FIG. 2) in the inside of the switcher body 2, while the fader 21b is provided for operating the synthesizing processing part 45 of the image processing part 41b in the inside of the switcher body.

Each fader 21 includes a slide-type lever 22 and an indicator 23. The fader 21 is operating means which, in applying the transition effect by the synthesizing processing part 45 in the inside of the switcher body 2, manually continuously changes a parameter indicative of an output rate of two video signals (the video signal before changeover and the video signal after changeover) by moving the lever 22 from one end portion to another end portion. The indicator 23 plays a role of displaying a position of the lever 22 with a LED (a light emitting diode).

Information indicative of a current position of the lever 22 is transmitted to the control part 12 (FIG. 3) at a fixed sampling cycle from the fader 21. The control part 12, every time that the position of the lever 22 indicated by the information is changed, calculates a parameter of a value corresponding to the current position of the lever 22 as a parameter indicative of the above-mentioned output rate of two video signals. Then, the control part 12 transmits the parameter to the control part 50 (FIG. 2) in the inside of the switcher body 2.

The control part 50 in the inside of the switcher body 2 controls the output rate of two video signals in the synthesizing processing part 45 using the parameter.

Figure 5:
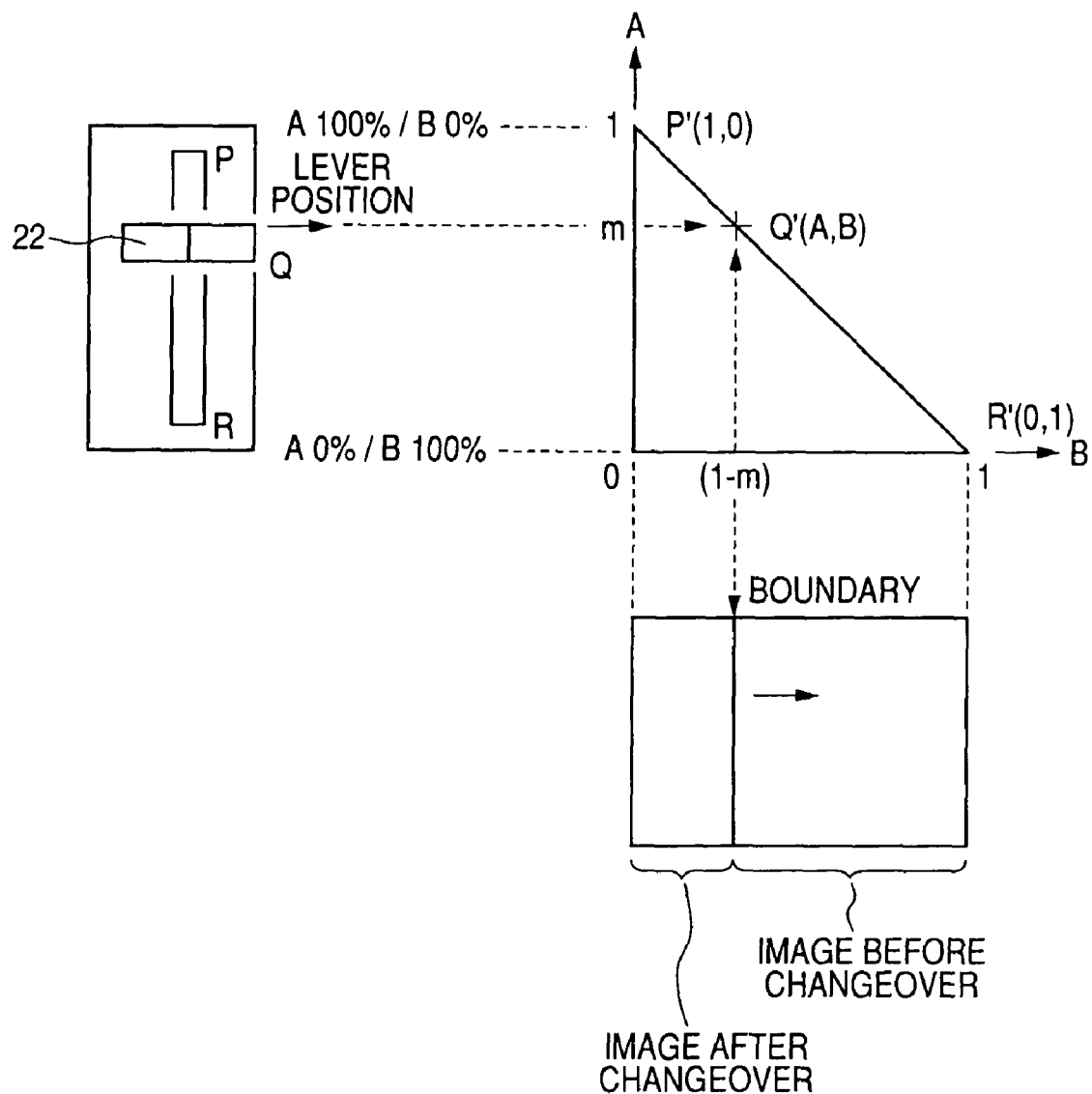
FIG. 5 is a view which illustrates the relationship between a position of a lever of a fader and an output rate of two video signals.

FIG. 5 is a view which illustrates the relationship between the position of the lever 22 of the fader 21 and the output rate of two video signals from the synthesizing processing part 45. As shown at a left side of an upper row in FIG. 5, when the lever 22 is moved toward a lower end R from an upper end P, the control part 12, based on a following formula, calculates parameters A, B at the current position Q of the lever 22 (the parameter A indicative of an output rate of the video signals before changeover, and the parameter B indicative of an output rate of the video signals after changeover with respect to two video signals).

$A = m$
$B = (1-m)$ (wherein, $0 \leq m \leq 1$)

Accordingly, when the lever 23 is moved to a lower end R from an upper end P, the parameters A, B are expressed as a coordinates value (A, B) of a point Q' which moves a line segment P'-R' from a point P' to a point R' in the inside of an AB coordinates space as shown at a right side of the upper row in FIG. 5. This implies that the output rate of two video signals gradually transits from a state in which the parameter A is 100% to a state in which the parameter B is 100%.

A low row in FIG. 5 shows the output rate of two video signals from the synthesizing processing part 45 at the position Q when a wipe is applied as a transition effect. When the lever 22 is positioned at an upper end P, the parameter A is 100% and hence, only the video signal before the changeover is outputted. Thereafter, the output rate of the video signal after changeover is increased as shown in the low row in FIG. 5, and when the lever 22 arrives at the lower end R, only the video signals after changeover are outputted.

Out of two sets of automatic transition buttons 24 shown in FIG. 4, the automatic transition buttons 24a correspond to the synthesizing processing part 45 of the image processing part 41a in the inside of the switcher body 2, while the automatic transition buttons 24b correspond to the synthesizing processing part 45 of the image processing part 41b. The automatic transition button 24 is a push button for automatically changing the output rate of two video signals at a fixed speed in applying the transition effect by the corresponding synthesizing processing parts 45.

When the automatic transition button 24 is operated, the control part 12 in the inside of the control panel 1 (FIG. 3) transmits a command which instructs the automatic transition to the control part 50 in the inside of the switcher body 2 (FIG. 2). The control part 50, in response to this command, changes the above-mentioned parameters A, B at a fixed speed with a lapse of a predetermined from a state in which the parameter A is 100% to a state in which the parameter B is 100%.

Further, the control part 50 transmits tally information for displaying a position of the lever 22 which agrees with the current output rate to the indicator 23 of the fader 21 which corresponds to the automatic transition button 24 to the control part 12 in the inside of the control panel 1. The control part 12 controls the display of the indicator 23 of the fader 21 corresponding to the automatic transition button 24 based on the tally information.

Out of two sets of groups of push buttons 25 in FIG. 4, the group of push buttons 25a is provided for allowing the input selecting part 42 of the image processing part 41a in the switcher body 2 to select the input signal, while the group of pushbuttons 25b is provided for allowing the input selecting part 42 of the image processing part 41b to select the input signal. In each group of push buttons 25, the push buttons are arranged in two rows, wherein the push buttons in the upper row are provided for allowing the input bus 43a to select the input signal, while the push buttons in the lower row are provided for allowing the input bus 43b to select the input signal.

The group of push buttons 26 for selecting key signals is provided for designating the key signal selecting part 47 of either one of the image processing parts 41a, 41b in the inside of the switcher body 2 and, at the same time, for allowing the designated key signal selecting part 47 to select the key signals.

Out of two sets of key ON/OFF changeover buttons 27, the button 27a is provided for changing over whether the key signal which is selected by the key signal selecting part 47 is to be synthesized by the key processing part 46 in the inside of the image processing part 41a or not, while the button 27b is provided for changing over whether the key signal which is to be selected by the key signal selecting part 47 is synthesized by the key processing part 46 in the inside of the image processing part 41b or not.

The group of push buttons 28 is provided for selecting one arbitrary VTR 4 shown in FIG. 1 and for controlling the VTR 4 so as to make the VTR generate video signals or stop the generation of the video signals.

The macro resister call button 29 and the group of push buttons 31 are push buttons for performing a macro function.

Next, the macro function is explained. The macro function is a function of registering the procedure of the operation which an operator performs on the operation console 11 in the memory inside the control part 12 (FIG. 3) as data and calling the data when necessary and automatically reproducing the same procedure. A memory region for recording the data is referred to as a macro register.

Due to this macro function, the operator can reduce the number of operations by preliminarily registering the complicated procedure in the macro register or can prevent an erroneous operation by setting the macro function to be operated in an interlocking manner with a function which is executed by a certain operation.

An operation which is performed on the operation console 11 which can be registered in the macro register is referred to as a macro event, and data which is formed of the macro event is referred to as event data. Each event data is constituted of a set of a symbol indicative of the operation and following parameters which become necessary for reproducing the operation for each operation of the operating means.

(1) parameter "ME" for discriminating the image processing part 41a and the image processing part 41b in the inside of the switcher body 2

(2) parameter "MEBus" for discriminating the input bus 43a and the input bus 43b (3) parameter "Xpt" for discriminating the input line (4) parameter "VideoKey" for discriminating whether the selecting input signal is the video signal or signal for synthesizing keying (signal designating a display region in which another video signal is to be synthesized).

FIG. 6 shows, as an example, the event data when an operation to select the input signal from the input line 44a in the input bus 43a of the input selecting part 42 of the image processing part 41a in the inside of the switcher body 2.

A set value "ME1" of the parameter "ME" indicates the image processing par 41a, while a set value "A" of the parameter "MEBus" indicates the input bus 43a.

A set value "1" of the parameter "Xpt" indicates the image input line 44a, while a set value "Video" of the parameter "VideoKey" indicates the video signal.

In one macro register, the above-mentioned event data is sequentially registered in accordance with the operation procedures of the respective operating means. Then, by calling the macro register, the procedure is automatically reproduced. 99 macro resisters with the register number ranging from 1 to 99 are provided. The macro register calling button 29 shown in FIG. 4 is a push button for, at the time of registering or executing the macro, imputing the arbitrary register number using the ten key 30 to call the register having the register number.

Out of these macro registers, the macro registers of arbitrary register number may be allocated to the push buttons which are arranged on the operation console 11 and the execution of the original function of the push buttons and the execution of the macro function may be interlocked with each other. This allocation is referred to as the macro attachment and data indicative of contents of the macro attachment is referred to as the macro attachment data. The macro attachment data is also registered in the memory in the inside of the control part 12. A memory region for registering the macro attachment data is referred to as macro attachment register.

The macro attachment data is constituted of a group of following parameters and event data which is obtained by forming the operation of push buttons at the time of setting the macro attachment into data. The event data is exactly the data which is already explained in conjunction with FIG. 6.

(1) a parameter "Module" which discriminates a module (a set of a plurality of push buttons having the same function on the operation console 11) which becomes an object of the macro attachment (2) a parameter "Button" which discriminates the push buttons which become an object of the macro attachment in the inside of the module (3) a parameter "MacroReg" which discriminates the register numbers of the macro registers which are allocated to the push buttons (4) a parameter "MacroMode" which discriminates a mode of the macro attachment In the mode which the parameter "MacroMode" indicates, a pre-mode which executes the original function of the push buttons prior to the macro function, a post mode which executes the original function of the push buttons after the macro function, and a no-assignment mode which executes the original function of the push buttons and the macro function in parallel are present. The group of push buttons 31 shown in FIG. 4 includes the push button for selecting this mode.

Due to these parameters, it is possible to determine the allocation of the macro registers of the specific register numbers to the specific push buttons on the operation console 11. Further, although the functions of the push buttons on the operation console 11 may be changed by the setup, based on the event data, it is possible to specify the functions that the push buttons have at the time of setting the macro attachment.

FIG. 7 shows the parameters of the macro attachment data when the macro registers having the register number of 1 is allocated to the push button on a left end of the upper row out of the group of push buttons 25a shown in FIG. 4.

A set value "ME1Xpt" of the parameter "Module" indicates the group of push buttons 25a, and a set value "ABus1" of the parameter "Button" indicates the push button on a left end of the upper row.

A set value "1" of the parameter "MacroReg" indicates the register number of 1, and a set number "Pre" of the parameter "MacroMode" indicates the above-mentioned pre-mode.

To set the macro attachment to a certain button, in a state that the macro register which is allocated to the push button is called, the push button is operated in a macro attachment setting enabling mode. Accordingly, the control part 12 prepares the macro attachment data with respect to the push button and registers the macro attachment data in the macro attachment register. The group of push buttons 31 shown in FIG. 4 includes the push button for changing over the macro attachment setting enabling mode between an ON state and an OFF state.

Further, when the similar operation is performed with respect to the push button to which the macro attachment is already set, the control part 12 releases the setting of the macro attachment with respect to the push button by deleting the macro attachment data with respect to the push button which is registered in the macro attachment register.

The control part 12, when the set enabling mode is turned on, allows an LED attached to the push button to which the macro attachment is set to perform a blinking operation. Accordingly, an operator who operates the control panel 1 can confirm whether the macro attachment is set in the push button.

In an execution enabling mode of the macro attachment, when the push button to which the macro attachment is set is operated, using such an operation as a trigger, the macro register having the register number which is allocated to the push button is automatically called and the event data which is registered in the macro register is sequentially executed. Accordingly, in an interlocking manner with the original function of the push button, the macro function is executed. The group of push buttons 31 shown in FIG. 4 also includes the push button for changing over the execution enabling mode between an ON state and an OFF state.

As the feature of the invention, the control panel 1 sets the macro attachment not only to the push button but also to the fader 21 (FIG. 4) thus enabling macro function in an interlocking manner with the transition effect attributed to the operation of the fader 21 or the automatic transition button 24. Attachment position setting buttons 32a, 32b shown in FIG. 4 are push buttons for supplying triggers to set the macro attachment to the faders 21a, 21b respectively.

Figure 8:
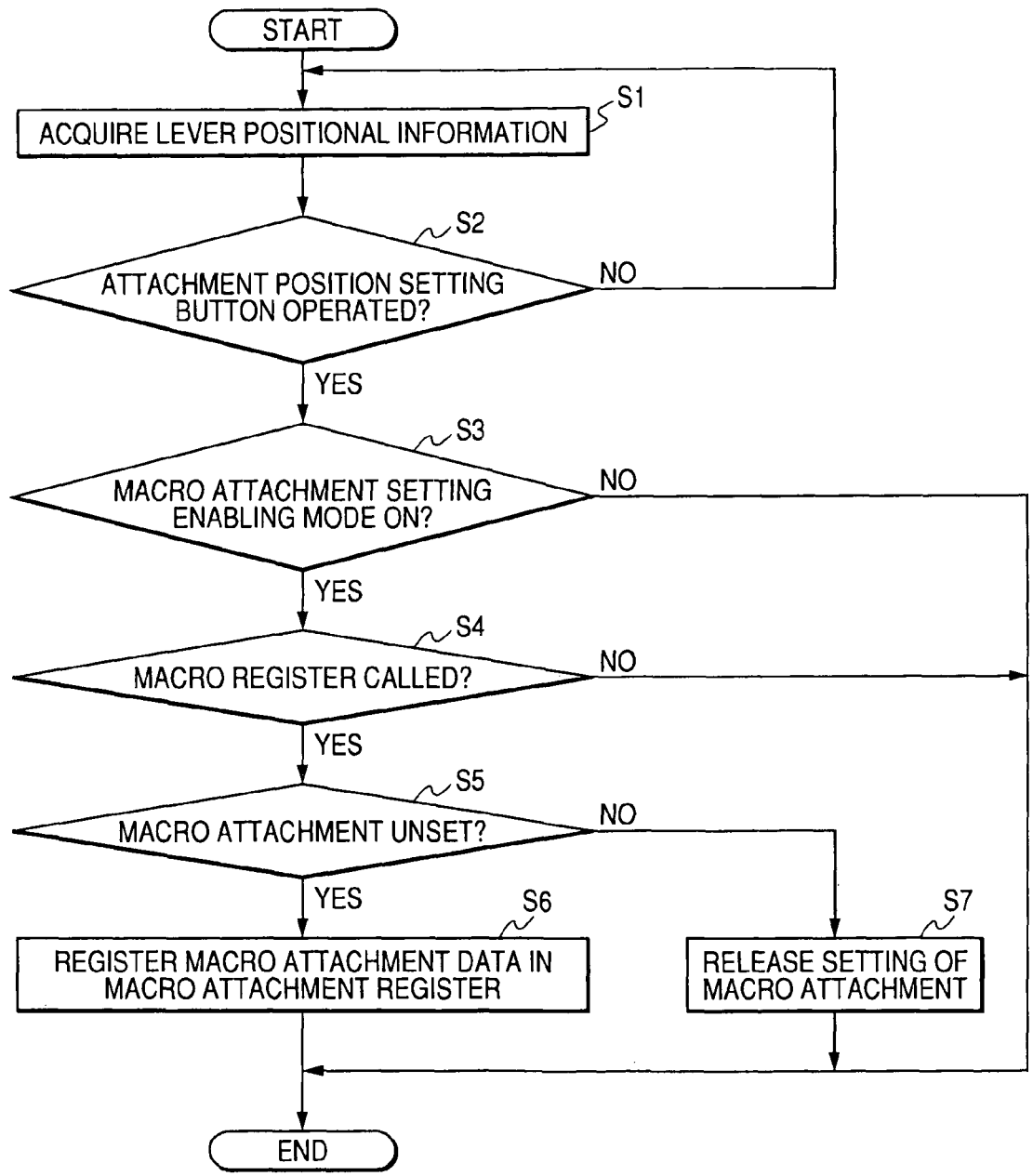
FIG. 8 is a flow chart showing processing for setting macro attachment to the fader.

FIG. 8 is a flow chart showing the processing in which the control part 12 in the inside of the control panel 1 (FIG. 3) set the macro attachment to the fader 21. In this processing, while acquiring the positional information of the lever 22 which is supplied from the faders 21a, 21b (step S1), the control part 12 stands by until either one of the attachment positing setting buttons 32a, 32b is pushed (step S2).

When either one of the attachment positing setting buttons 32a, 32b is pushed, the control part 12 determines whether the setting enabling mode of the macro attachment is turned on by the group of push buttons 31 (FIG. 4) or not (step S3). If the determination is negative, the processing is finished as it is. On the other hand, if the determination is affirmative, the control part 12 determines whether the macro register of any one of register number is called by the push button 29 and the ten key 30 (FIG. 4) or not (step S4).

If the determination is negative, the processing is finished as it is. On the other hand, if the determination is affirmative, the control part 12 determines whether the macro attachment is unset or not (whether the macro attachment data is unregistered in the macro attachment register or not) with respect to the fader 21 corresponding to the pushed attachment position setting button 32 (the fader 21a when the attachment position setting button 32a is pushed, and the fader 21b when the attachment position setting button 32b is pushed) (step S5).

If the determination is affirmative, the control part 12 prepares the macro attachment data which includes the parameter indicative of the current position of the lever 22 (position indicated by the positional information acquired lastly in step S1) in the event data and registers the macro attachment data in the macro attachment register (step S6). Then, the processing is finished.

If the determination in step S5 is negative, by deleting the macro attachment data with respect to the fader which is registered in the macro attachment register, the control part 12 releases the setting of the macro attachment with respect to the fader (step S7). Then, the processing is finished.

The macro attachment data which is prepared in step S6 shown in FIG. 8 is constituted of a group of parameters of the macro attachment data illustrated in FIG. 7 and the event data for faders. The event data for faders is constituted of symbols indicative of the operations of the faders and a group of following parameters which become necessary for reproducing the operations.

(1) a parameter "ME" which discriminates the image processing part 41a and the image processing part 41b in the inside of the switcher body 2

(2) a parameter "FaderValue" indicative of the position of the lever 22 at the time of setting the macro attachment (position indicated by the positional information acquired lastly in step S1 in FIG. 8)

Figure 10:
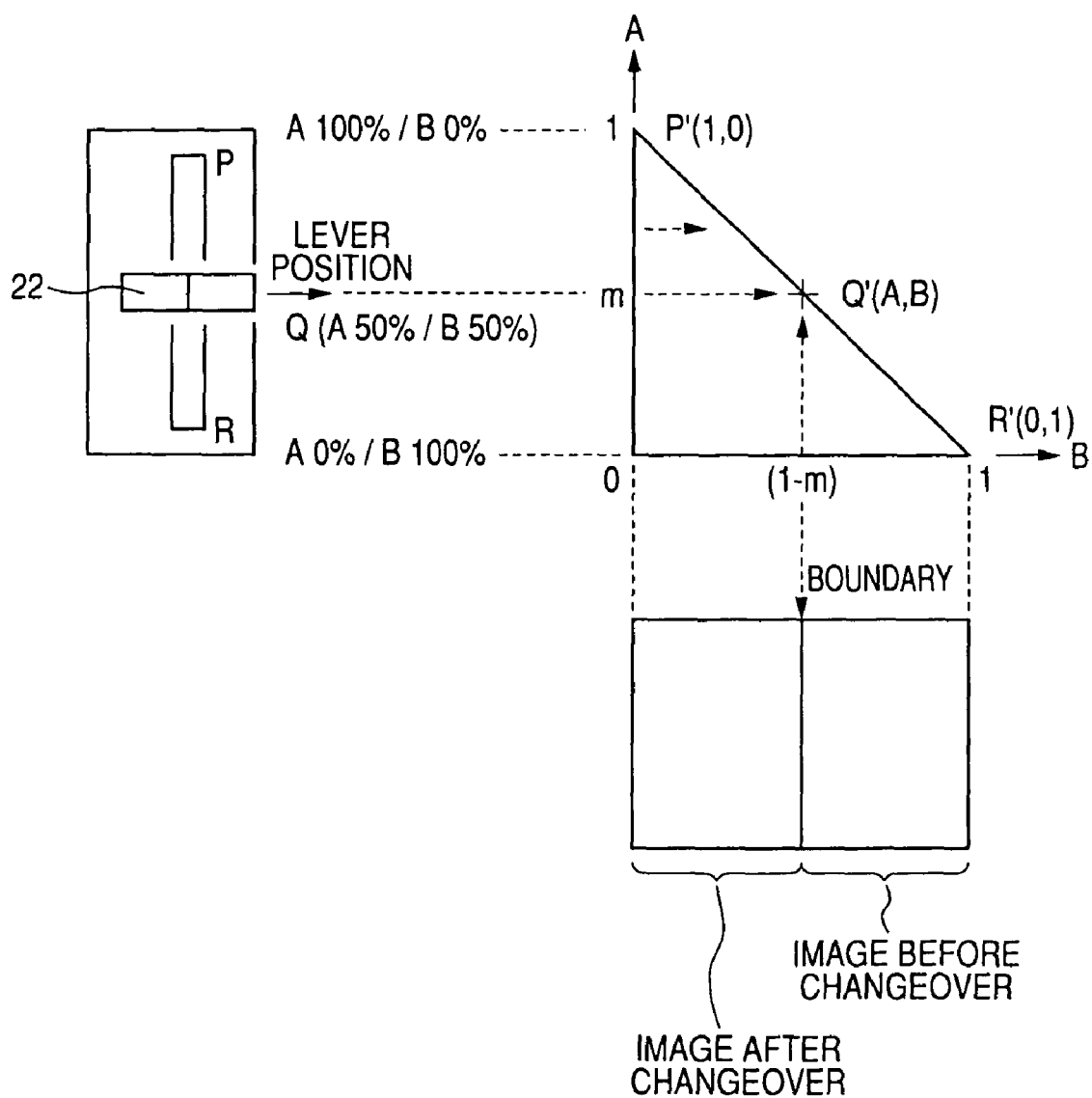
FIG. 10 is a view showing a state of the fader that the lever is positioned at the center.

FIG. 9 shows, as an example, macro attachment data which is prepared by pushing the attachment position setting button 32b when the lever 22 of the fader 21b is located at the center between the upper end and the lower end. FIG. 10 shows a state in which the lever 22 is set at this center position Q in conjunction with the output rate of two video signals from the synthesizing processing part 45 in the same manner as the above-mentioned relationship between the fader lever and the output rate of two video signals shown in FIG. 5.

In FIG. 9, the set value "PPStandardTransition" of the parameter "Module" indicates the module which includes the fader 21b, while the set value "MainFader" of the parameter "Button" indicates the fader 21b.

The set value "1" of the parameter "MacroReg" indicates the register number of 1 and the set value "NoAssign" of the parameter "MacroMode" indicates the above-mentioned no-assign mode (mode which executes the original function of the fader in parallel with the macro function).

The set value "PP" of the parameter "ME" in the event data indicates the image processing part 41b.

The set value "50" of the parameter "FaderValue" in the event data is a value of the current position when a movable range m of the lever 22 is set to a value which falls within a range of $0 \leqq m \leqq 100$ and indicates a center position between the upper end and the lower end.

Due to the processing shown in FIG. 8, an operator who operates the control panel 1 can move the lever 22 of the fader 21 to the arbitrary position so as to allocate the macro register with respect to the position of the lever 22.

Here, the control part 12, when the setting enabling mode is turned on, allows the indicator 23 to indicate the position of the lever 22 at a point of time that the macro attachment is set. Accordingly, the operator can confirm the position of the lever 22 in a state that the macro attachment is set in the fader 21.

Figure 11:
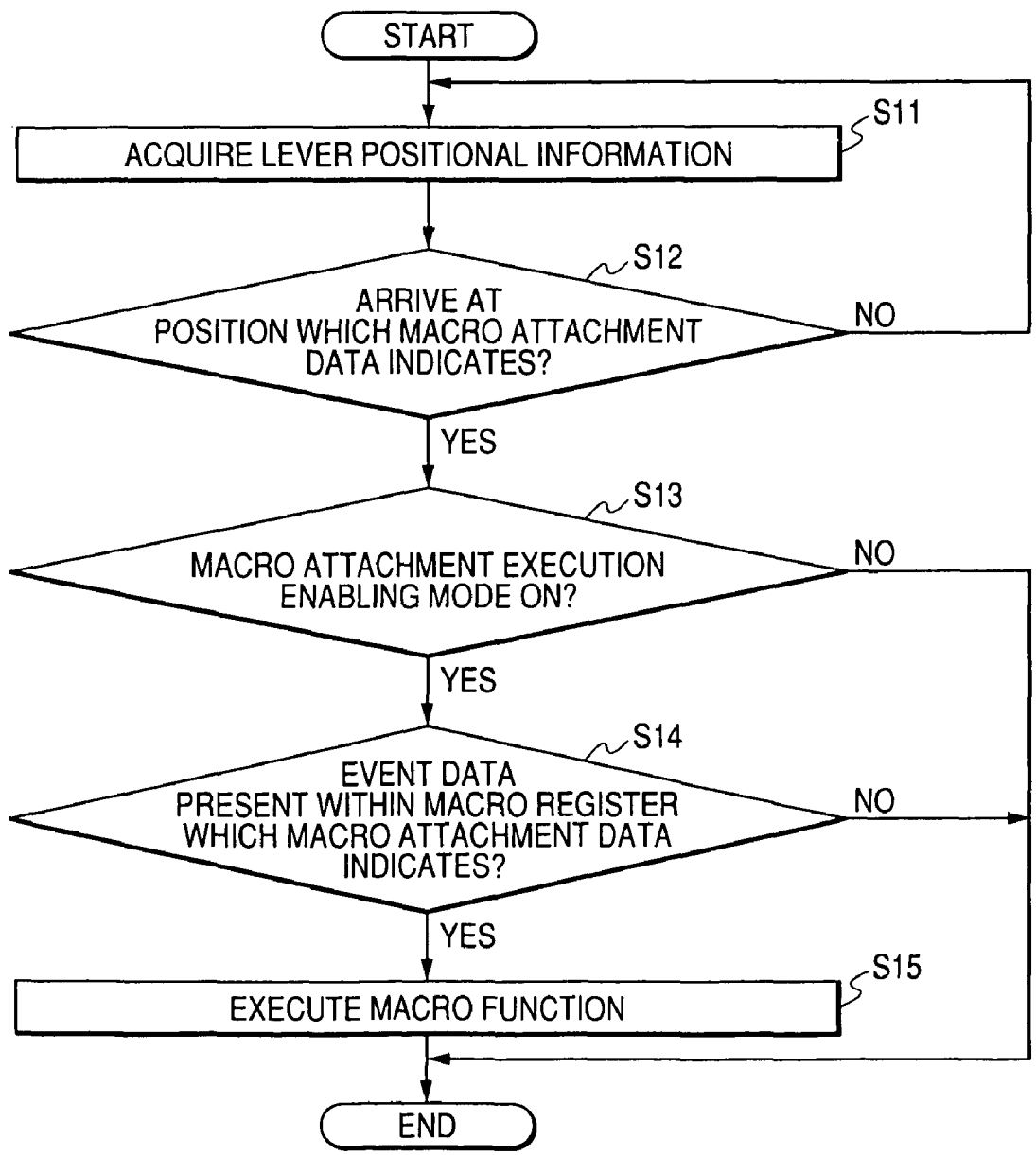
FIG. 11 is a flow chart showing processing for executing a macro function in operating the fader.

FIG. 11 shows a flow chart showing the processing for executing the macro function by the control part 12 when the fader 21 to which the macro attachment is set is operated. In this processing, when the positional information of the lever 22 which is transmitted from the fader 21 is acquired (step S11), the control part 12 determines whether the current position of the lever 22 arrives at the position which the parameter "FaderValue" in the macro attachment data with respect to the fader 21 which is registered in the macro attachment register (see FIG. 9) indicates or not (step S12).

If the determination is negative, the procedure returns to step S11 and the procedure in step S11 and S12 is repeated. Then, if the determination is affirmative in step S12, the control part 12 determines whether the execution enabling mode of the macro attachment is turned on by the group of push buttons 31 or not (FIG. 4) (step S13).

If the determination is negative, the processing is finished as it is. On the other hand, if the determination is affirmative, the control part 12 determines whether at least one event data is registered in the macro register of the register number which the parameter "MacroReg" in the above-mentioned macro attachment data (see FIG. 9) indicates (step S14).

If the determination is negative, the processing is finished as it is. On the other hand, if the determination is affirmative, the control part 12 executes the macro function (reproduces the procedure of the operation indicated by the event data in the inside of the macro register) in a mode which the parameter "MocroMode" (see FIG. 9) in the macro attachment data indicates (step S15). Then, the processing is finished.

Due to the processing shown in FIG. 11, with the mere operation of the fader 21 by the operator, at timing that the lever 22 arrives at the specified position (the position which the operator arbitrarily determines at the time of setting the macro attachment), the function of another push button which is registered in the macro register is automatically executed.

Figure 12:
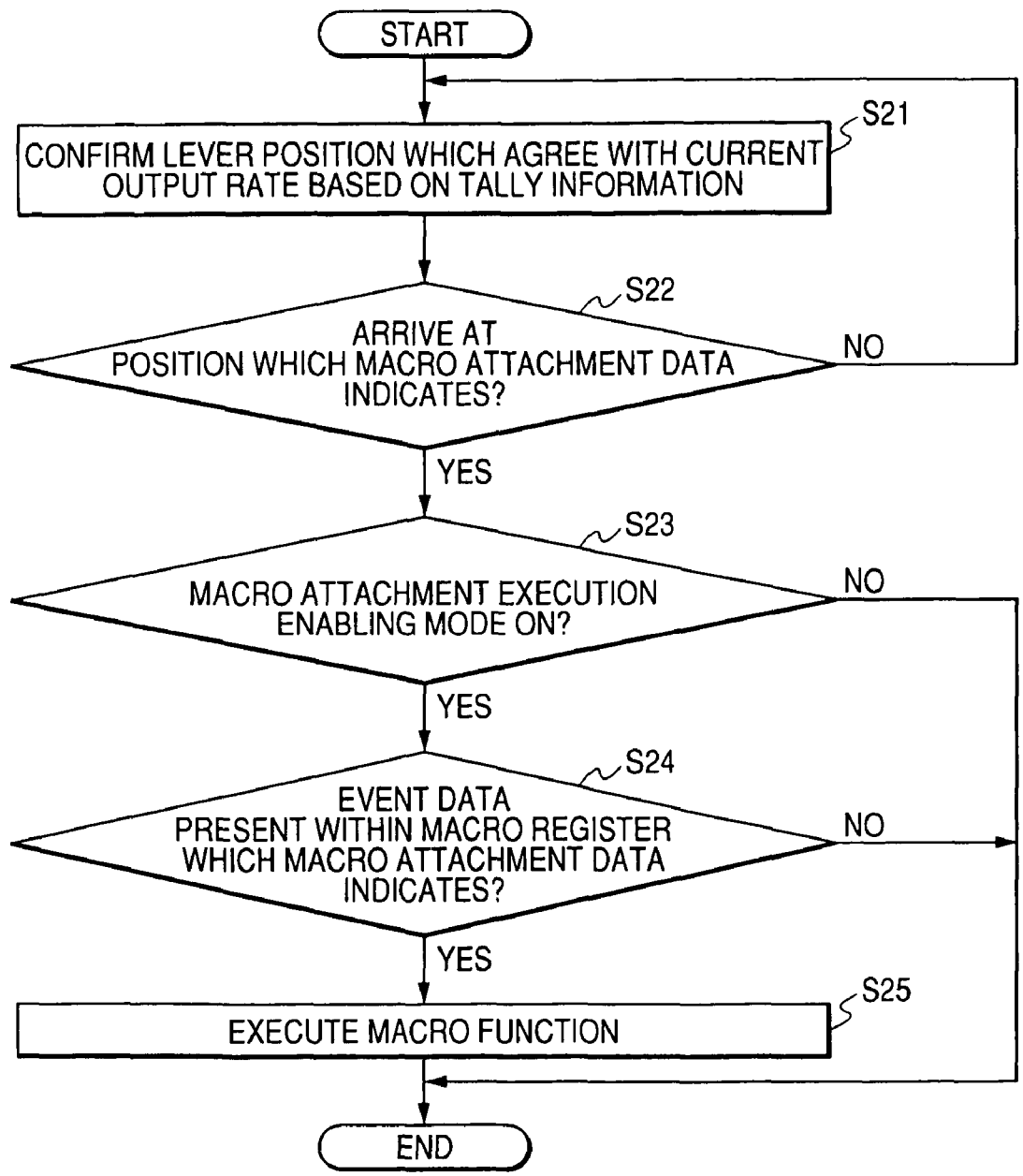
FIG. 12 is a flow chart showing processing for executing a macro function in operating an automatic transition button.

FIG. 12 shows a flow chart showing the processing that the control part 12 executes the macro function when the automatic transition button 24 (the automatic transition button 24*a* with respect to the fader 21*a* and the automatic transition button 24*b* with respect to the fader 21*b*) corresponding to the image processing part 41 in the same manner as the fader 21 to which the macro attachment is set is operated.

In this processing, the control part 12 confirms, based on the above-mentioned tally information which is transmitted from the control part 50 (FIG. 2) in the inside of the switcher body 2 for displaying at the indicator 23 of the fader 21, the position of the lever 22 which agrees with the current output rate of two video signals in the synthesizing processing part 45 in the inside of the switcher body 2 (step S21).

Then, the control part 12 determines whether the position of the lever 22 arrives at the position which the parameter "FaderValue" (see FIG. 9) in the macro attachment data with respect to the fader 21 which is registered in the macro attachment register indicates or not (step S22).

If the determination is negative, the procedure returns to step S21 and the procedure in step S21 and step S22 is repeated. Then, if the determination in step S22 is affirmative, the procedure advances to step S23. The processing after step S23 is equal to the processing after step S13 in FIG. 11 and hence, the explanation of the processing is omitted.

Due to the processing in FIG. 12, even when the operator operates the automatic transition button 24, at timing that the position of the lever 22 arrives at output rate corresponding to the specific position of the lever 22, a function of another push button which is registered in the macro register is automatically executed.

Here, the control part 12 changes, at a point of time that the macro function is executed by processing shown in FIG. 11 and FIG. 12 (at a point of time of S15 and S25), the display state of the indicator 23 (for example, changes the display state from a lighting state to a flickering state or changes display color). Accordingly, the operator can confirm that the macro function is executed.

As described above, in the switcher, by operating the fader 21 or the automatic transition button 24, at timing that the parameter which indicates the output rate of two video signals in the synthesizing processing part 45 in the inside of the switcher body 2 assumes a specified value, another push-button function is automatically executed. Accordingly, other functions can be easily and accurately performed in an interlocking manner with the operation of the fader 21 or the automatic transmission buttons 24.

Further, the position of the lever 22 of the fader 21 can be decided at the arbitrary position at the time of setting the macro attachment and hence, it is possible to execute the function of another push button at the arbitrary timing.

Still further, by allocating the fader 21 to the macro register to which a plurality of event data is registered, the operational procedure of the plurality of buttons can be automatically reproduced in an interlocking manner with the operation of the fader 21 or the automatic transition button 24. Accordingly, even when it is necessary to execute a series of functions in accordance with the difficult procedure or it is necessary to executer a large number of another functions in an interlocking manner with the fader 21 or the automatic transition button 24, it is possible to execute these functions accurately.

Lastly, a specific example of a function which is interlockingly executed with the operation of the fader 21 or the automatic transition button 24 is introduced.

Figure 13:
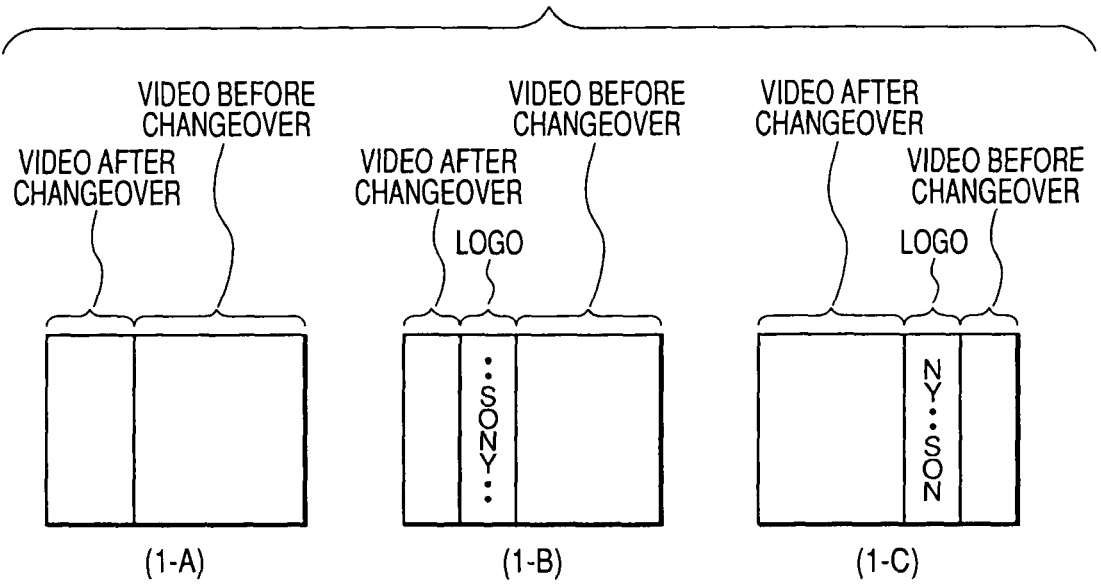
FIG. 13 is a view showing an example which controls VTR in an interlocking manner with a transition effect.

FIG. 13 shows an example in which a control of the VTR 4 (FIG. 1) is interlocked when a wipe is applied as the transition effect. In making use of the wipe or a DME wipe for changing a scene, by displaying another image (a video signal key frame data, animation data from the VTR) in the vicinity of a boundary between an image before changeover and an image after changeover from a point of time that the boundary reaches a certain position, it is possible to make the scene more dynamic.

FIG. 13 illustrates an image effect in which at a point of time that such a boundary reaches the certain position (1-A at a left end) at wiping, the boundary portion has a width (1-B at the center), wherein a video signal (logo "SONY") from the VTR flows from top to bottom and the output rate of the image after changeover is increased (1-C at a right end).

In such a case, by allocating the macro register to which the event data is registered attributed to the operation of the group of push buttons 28 for VTR control (FIG. 4) at the time of setting the macro attachment to the fader 21, by merely operating the fader 21 or the automatic transition button 24, the boundary at the time of wiping passes this position and, at the same time, the logo is automatically reproduced from the VTR 4 and hence, it is possible to obtain a targeted image effect.

Although push buttons for the key frame and animation are not shown in FIG. 4, it is needless to say that by allocating the macro register to which the event data is registered attributed to the operation of these pushbuttons, the key frame data or the animation data can be automatically reproduced in the same manner.

Figure 14:
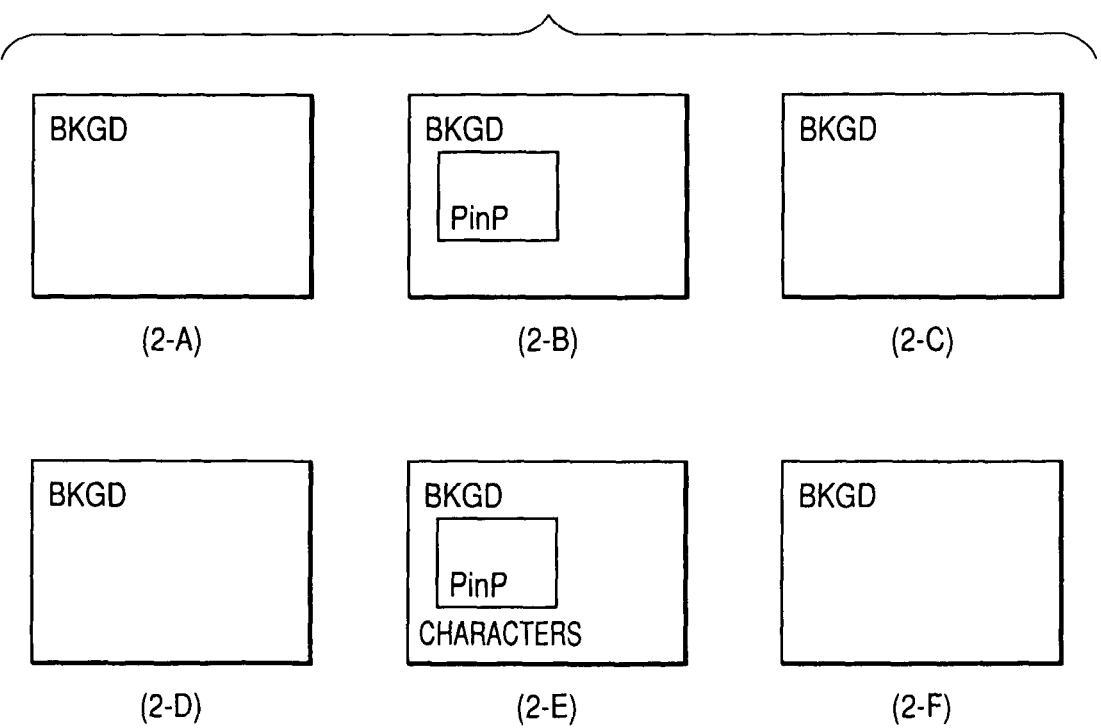
FIG. 14 is a view showing an example which synthesizes character in an interlocking manner with the transition effect.

FIG. 14 shows an example in which a control of the key processing part 46 or the key signal selecting part 47 in the inside of the switcher body 2 (FIG. 2) is interlocked when the keying synthesizing is applied as the transition effect. As shown in an upper row of FIG. 14, a following image change is frequently used in a news program or a sport program. That is, into a partial region of a screen on which a background image BKGD) is displayed (2-A at a left end), another image PinP is inserted (2-B at center). Then, after a fixed time elapses, the image PinP disappears from the screen (2-C at a right end).

Here, it is often the case that characters such as title or logo (key signals) are synthesized at timing of performing the inserting operation of the image PinP. In such a case, by allocating the macro register which is registered in the event data attributed to the operation of the group of push buttons 26 for key signal selection or the key-on/key-off changeover button 27 (FIG. 4) at the time of setting the macro attachment to the fader 21, by merely operating the fader 21, as shown in the lower row in FIG. 14, it is possible to automatically synthesize the characters simultaneously with the inserting operation of the image PinP (2-E at the center) and, it is also possible to automatically erase the characters simultaneously with the releasing of the insertion of the image PinP.

As described above, the output image which is relatively frequently used as an image effect in the news editing or the production of the sport program can be easily prepared without an operational error and feeding error.

Here, in the above-mentioned embodiment, one macro attachment data is registered in one fader 21 (steps S5 to S7 in FIG. 8). However, as another example, respective macro attachment data may be registered in the fader 21 every time the position of the lever 22 is changed. Due to such a control, during a period in which the lever 22 is moved from one end portion to another end portion, a plurality of macro functions may be sequentially automatically executed.

Further, in the above-mentioned embodiment, as shown in FIG. 8, the macro attachment is set in the fader 21 due to the operation of the fader 21 per se. However, when the control part 12 of the control panel 1 is capable of executing the processing in which the parameter indicative of the output rate of two video signals is calculated based on control signals outside the control panel 1 (for example, GPI signals) and is transmitted to the control part 50 in the inside of the switcher body 2, the macro attachment may be set in the fader 21 by operating the attachment position setting button 32 at timing that the calculated parameter assumes the arbitrary value.

Further, in the above-mentioned embodiment, at timing that the parameter indicative of the output rate of two video signals assumes the certain specific value in applying the transition effect, the macro function is automatically executed. However, as another embodiment, it may be possible to apply the invention to an image signal processing apparatus which applies various processing (brightness adjustment, digital processing such as mosaic processing) to the video signals and to automatically execute the macro function at timing that a parameter for performing such processing assumes a certain specific value.

Further, in the above-mentioned embodiment, the invention is applied to switcher which includes one control panel 1. However, as another embodiment, the invention is also applicable to the switcher which mounts plural sets of control panels on one switcher body. In such a case, for example, it is preferable that by allowing any one of the control panels to set to macro attachment in the fader, the macro function is executed in all control panels in an interlocking manner with the operation of the fader.

Further, in the above-mentioned embodiment, the invention is applied to the switcher which is a kind of the image signal processing apparatus. However, as another example, it may be possible to apply the invention to an apparatus which applies processing such as synthesizing to vocal signals and to automatically execute the macro function at timing that the parameter for performing the processing assumes a certain specific value.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus comprising:
    signal processing means for applying predetermined processing to a signal to be supplied;
    parameter adjusting means for manually and continuously changing a parameter in processing the signal using the signal processing means;
    at least one operating means which has a function different from a function of the parameter adjusting means;
    forming means for forming data which makes a value of the parameter and any one of the operating means correspond to each other;
    detection means for detecting that a current parameter value attributed to the operation of the parameter adjusting means agrees with a value of a parameter within the data; and
    function executing means for executing a function of the operating means in response to the value of the parameter within the data based on a detection result of the detection means.

2. A signal processing apparatus according to claim 1, wherein the data is data which makes the parameter value and the procedure of operation of two or more operating means correspond to each other, and
    the function executing means executes the functions of the operating means corresponding to the parameter in the inside of data in accordance with the procedure based on a detection result of the detection means.

3. A signal processing apparatus according to claim 1, wherein the signal processing means is a circuit which applies an effect to transit an video signal to be outputted from a certain video signal to another video signal, and
    the parameter adjusting means is operating means for manually continuously changing the parameter indicative of an output rate of two video signals in applying the effect.

4. A signal processing apparatus according to claim 1, wherein the parameter adjusting means is a fader which changes the parameter by moving a slide-type lever.

5. A signal processing apparatus according to claim 1, wherein the signal processing apparatus includes a plurality of parameter adjusting means, and the data is data which makes information which specifies any one of parameter adjusting means out of the plurality of parameter adjusting means and the parameter value correspond to each other.

6. A signal processing apparatus according to claim 1, wherein the signal processing apparatus further includes parameter automatically adjusting means for automatically adjusting the parameter, and
    the function executing means determines, when the parameter is adjusted by the parameter automatically adjusting means, that the current value of parameter agrees with the parameter value in the inside of data based on information on the current parameter value supplied from the parameter automatically adjusting means, and executes the function of the operating means corresponding to the parameter value in the inside of the data.

7. A signal processing apparatus according to claim 1, wherein the signal processing apparatus further includes operating means for changing over ON/OFF of the operation of the function executing means.

8. A signal processing apparatus according to claim 1, wherein the signal processing apparatus further includes operating means for instructing the forming means to form the data.

9. A signal processing apparatus according to claim 1, wherein the signal processing apparatus includes an input selecting means for selecting a signal which is supplied to the signal processing means out of input signals of a plurality of channels, and the operating means includes operating means for instructing the selection of the input signal at the input selecting means.

10. A signal processing apparatus according to claim 1, wherein the signal processing apparatus includes control means for controlling an external equipment and the operating means includes operating means for instructing a control of the external equipment.

11. A signal processing apparatus according to claim 1, wherein the signal processing apparatus further includes display means for indicating a current value of the parameter, and control means for making a display state of the display means when the function executing means is operated different from a display state of the display means when the function executing means is not operated.

12. A method for executing functions of operating means in a signal processing apparatus which includes:
   signal processing means for applying predetermined processing to a signal to be supplied;
   parameter adjusting means for manually and continuously changing a parameter in processing the signal using the signal processing means;
   at least one operating means which has a function different from a function of the parameter adjusting means; and
   control means for executing functions of the parameter adjusting means and the operating means,
   the method comprising the steps of
   forming by the control means data which makes a value of the parameter and any one of operating means correspond to each other;
   detecting by the control means that a current value of the parameter attributed to the operation of the parameter adjusting means and the value of the parameter within the data agree with each other; and
   executing by the control means a function of the operating means corresponding to the value of the parameter within the data based on a result of the detection.

13. A signal processing apparatus comprising:
   a signal processing part which applies predetermined processing to a signal to be supplied;
   a parameter adjusting part which manually and continuously changes a parameter in processing the signal using the signal processing part;
   at least one operating part which has a function different from a function of the parameter adjusting part;
   a forming part which forms data which makes a value of the parameter and any one of the operating parts corresponding to each other;
   a detection part which detects that a current parameter value attributed to the operation of the parameter adjusting part agrees with a value of a parameter within the data; and
   a function executing part which executes a function of the operating parts in response to the value of the parameter within the data based on a detection result of the detection part.

* * * * *